United States Patent
Bates

(10) Patent No.: US 9,678,688 B2
(45) Date of Patent: Jun. 13, 2017

(54) SYSTEM AND METHOD FOR DATA DEDUPLICATION FOR DISK STORAGE SUBSYSTEMS

(75) Inventor: John W. Bates, Mendon, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 62 days.

(21) Appl. No.: 13/182,669

(22) Filed: Jul. 14, 2011

(65) Prior Publication Data

US 2012/0016845 A1 Jan. 19, 2012

Related U.S. Application Data

(60) Provisional application No. 61/365,193, filed on Jul. 16, 2010.

(51) Int. Cl.
*G06F 3/06* (2006.01)
*G06F 17/30* (2006.01)
(Continued)

(52) U.S. Cl.
CPC ............ *G06F 3/067* (2013.01); *G06F 3/0608* (2013.01); *G06F 3/0641* (2013.01);
(Continued)

(58) Field of Classification Search
CPC ................................................ G06F 17/30315
(Continued)

(56) References Cited

U.S. PATENT DOCUMENTS 5,546,477 A 8/1996 Knowles et al.
7,076,108 B2 7/2006 Huang et al.
(Continued)

FOREIGN PATENT DOCUMENTS

| EP | 1 912 160 | 4/2008 |
|---|---|---|
| WO | WO 2009/103496 A1 | 8/2009 |
| WO | WO2010045262 A1 | 4/2010 |

OTHER PUBLICATIONS

Ali, Musawir, "An Introduction to Wavelets and the Haar Transform", archived on Nov. 23, 2008, http://web.archive.org/web/20081123083946/http://www.cs.ucf.edu/~mali/haar/.*

(Continued)

*Primary Examiner* — Brittany N Allen
(74) *Attorney, Agent, or Firm* — Muirhead and Saturnelli, LLC

(57) ABSTRACT

A method for data deduplication includes the following steps. First, segmenting an original data set into a plurality of data segments. Next, transforming the data in each data segment into a transformed data representation that has a band-type structure for each data segment. The band-type structure includes a plurality of bands. Next, selecting a first set of bands, grouping them together and storing them with the original data set. The first set of bands includes non-identical transformed data for each data segment. Next, selecting a second set of bands and grouping them together. The second set of bands includes identical transformed data for each data segment. Next, applying a hash function onto the transformed data of the second set of bands and thereby generating transformed data segments indexed by hash function indices. Finally, storing the hash function indices and the transformed data representation of one representative data segment in a deduplication database.

22 Claims, 11 Drawing Sheets

(51) Int. Cl.
*H04N 19/63* (2014.01)
*G06F 11/14* (2006.01)

(52) U.S. Cl.
CPC ....... *G06F 17/30138* (2013.01); *H04N 19/63* (2014.11); *G06F 11/1453* (2013.01); *G06F 17/30247* (2013.01); *G06F 17/30312* (2013.01)

(58) Field of Classification Search
USPC ........................................................ 707/693
See application file for complete search history.

(56) References Cited

U.S. PATENT DOCUMENTS

| | | | |
|---|---|---|---|
| 7,092,956 | B2 | 8/2006 | Ruediger |
| 7,287,019 | B2 | 10/2007 | Kapoor et al. |
| 7,814,149 | B1 | 10/2010 | Stringham |
| 7,860,308 | B2 | 12/2010 | Shah |
| 2001/0036323 | A1 | 11/2001 | Chui |
| 2002/0126872 | A1* | 9/2002 | Brunk et al. ................ 382/100 |
| 2003/0138157 | A1 | 7/2003 | Schwartz |
| 2004/0025025 | A1* | 2/2004 | Venkatesan et al. ......... 713/176 |
| 2004/0131271 | A1 | 7/2004 | Cho et al. |
| 2007/0127813 | A1 | 6/2007 | Shah |
| 2008/0002896 | A1 | 1/2008 | Lu et al. |
| 2008/0144079 | A1 | 6/2008 | Pandey et al. |
| 2008/0243769 | A1 | 10/2008 | Arbour et al. |
| 2008/0270729 | A1* | 10/2008 | Reddy et al. ................ 711/170 |
| 2009/0089483 | A1 | 4/2009 | Tanaka et al. |
| 2009/0171888 | A1* | 7/2009 | Anglin ............................ 707/2 |
| 2009/0234870 | A1 | 9/2009 | Bates et al. |
| 2009/0307251 | A1 | 12/2009 | Heller et al. |
| 2010/0005048 | A1* | 1/2010 | Bodapati et al. ............... 706/47 |
| 2010/0082558 | A1 | 4/2010 | Anglin et al. |
| 2010/0083003 | A1 | 4/2010 | Spackman |
| 2010/0088349 | A1 | 4/2010 | Parab |
| 2010/0125553 | A1 | 5/2010 | Huang et al. |
| 2010/0235332 | A1 | 9/2010 | Haustein et al. |
| 2010/0281208 | A1* | 11/2010 | Yang ............................ 711/103 |
| 2011/0035541 | A1 | 2/2011 | Tanaka et al. |
| 2011/0161291 | A1* | 6/2011 | Taleck et al. ................. 707/622 |

OTHER PUBLICATIONS

Christopoulos et al.; The JPEG2000 Still Image Coding System: An Overview, IEEE Transactions on Consumer Electronics, vol. 46, No. 4, Nov. 2000.*
Yeung et al.; Compressing Similar Image Sets Using Low Frequency Template, 2011 IEEE.*
Huang et al.; Wavelet Feature Selection for Image Classification, IEEE Transactions on Image Processing, vol. 17, No. 9, Sep. 2008.*
Srinivasan et al.; Finding Near-duplicate Images on the Web using Fingerprints, MM'08, Oct. 26-31, 2008.*
Hilton et al., "Compressing still and moving images with wavelets", Multi-media systems 1994.*
European Search Report dated Sep. 22, 2016.

* cited by examiner

FIG. 2C

SYSTEM AND METHOD FOR DATA DEDUPLICATION FOR DISK STORAGE SUBSYSTEMS

CROSS REFERENCE TO RELATED CO-PENDING APPLICATIONS

This application claims the benefit of U.S. provisional application Ser. No. 61/365,193 filed on Jul. 16, 2010 and entitled SYSTEM AND METHOD FOR STRUCTURAL DATA DEDUPLICATION FOR DISK STORAGE SUBSYSTEMS which is commonly assigned and the contents of which are expressly incorporated herein by reference.

FIELD OF THE INVENTION

The present invention relates to a system and a method for data deduplication, and more particularly to data deduplication that is based on identifying structurally identical data.

BACKGROUND OF THE INVENTION

Businesses as well as individuals are becoming increasingly dependent on computers, networks and electronic data storage. Electronic data are usually stored in local storage systems and/or network-based cloud storage systems. As more and more data are generated, the need for efficient and reliable data backup storage systems and methods is also increasing. The rapid growth of data storage requirements, as well as the increasing need for data to be distributed over networks spanning the globe, has led people to seek ways to reduce the amount of data being stored and distributed, without reducing the information or utility of that data. Therefore, the use of data deduplication technology for managing capacity and bandwidth is rapidly emerging as a standard practice.

In the data storage industry, deduplication refers to a process which searches for regions within a file system or disk which contain duplicate data, stores that data in some form of database, and then replaces the regions with references to the database. In a simple file system implementation, for example, multiple copies of the same file would be replaced by links to a central repository, while a more sophisticated implementation might look inside the files for shared segments. Disk systems, also called block-based systems, lack the insight into file system structure, and will typically base their comparisons on the raw blocks of the disk.

Data deduplication technology breaks an incoming data stream into a series of data segments and tests the system for the presence of each data segment before storing it, in order to avoid storing it multiple times. Data deduplication technology also identifies and removes those portions of data which are redundant, thus allowing systems to store and transmit only small references to much larger data segments. Some storage systems that utilize data deduplication technology can achieve high data compression factors of 10 to 50 or more.

The basic approach to deduplication on storage systems includes the following steps. First, data is received by the deduplication subsystem and broken into segments, each of the segments is then tagged by some variant of a hashing code. The role of the hashing code is to serve as a short identifier for a much larger segment of data, and is used as a component in a large index structure. The incoming segment's hash code is compared against existing entries in the index, and if no match is found, it is stored in an entry containing both the hash code and the original data. Some virtual representation of the storage container exists as well, and the hash code is used within that virtual representation as a placeholder for that data segment. If the incoming hash code does match an existing index entry, then that hash code is simply placed into the virtual representation. When a request to access a storage location is received by the storage subsystem, it begins processing by looking within the corresponding virtual representation of the storage segment(s) within that container. The hash codes are retrieved and used to retrieve the original segments from the index. Finally, those segments are used to reconstruct the contents of the original storage location.

There are a number of variations on that basic theme, including fixed- or variable-length segments, in-line or post-process deduplication, or file- versus block-based representation. In-line deduplication is done upon initial receipt of an IO request by the storage subsystem, while post-process deduplication is performed some time after the original data is stored. Post-process deduplication presents less performance overhead, at the cost of having to store all of the original data for some period of time. File-based deduplication works within a file system, searching for duplicate or similar files, while block-based deduplication treats the entire subsystem as a single data stream, without regard for higher-level structure.

Data deduplication is extremely effective in a number of commonly used modern computational environments. Microsoft Exchange, for example, stores as many copies of a file as are sent for distribution. Virtualized server environments like VMWare's ESX server is often configured with a large number of virtual machines, each of which may be extremely similar. In these types of situations, the actual amount of storage used can be greatly reduced, since all of the identical data segments across all of the files and virtual machines will occupy only a single entry in the hash index. As was mentioned above, deduplication ratios of 10:1 are often claimed as the average performance, meaning that for every 10 storage units used in the original data set, only one storage unit is used in the deduplicated set. It is very simple to come up with data sets that achieve much higher deduplication rates simply by including more duplicate data, e.g. by adding more virtual machines.

The variations on the baseline approach all have different trade-offs and impacts on performance, both of the IO processing and the deduplication effectiveness. Using smaller segments, for example, results in more of the segments matching, but the indexing overhead grows to overwhelm the effectiveness of the data reduction. Fundamentally, though, these differences are minor, and in general, all identical data is matched and reduced to a single copy. Some deduplication approaches may seek "almost-identical" segments, comparing two segments, finding that they are almost the same, and then storing just the differences, but these are functionally identical to the variable-length baseline.

In summary, efficient deduplication system and methods are desirable.

SUMMARY OF THE INVENTION

The invention provides a system and a method for data deduplication, and more particularly to data deduplication that is based on identifying structurally identical data.

In general, in one aspect, the invention features a method for data deduplication including the following steps. First, segmenting an original data set into a plurality of data segments. Next, transforming the data in each data segment into a transformed data representation that comprises a band-type structure for each data segment. The band-type structure includes a plurality of bands. Next, selecting a first set of bands, grouping them together and storing them with the original data set. The first set of bands comprises non-identical transformed data for each data segment. Next, selecting a second set of bands and grouping them together. The second set of bands comprises identical transformed data for each data segment. Next, applying a hash function onto the transformed data of the second set of bands and thereby generating transformed data segments indexed by hash function indices. Finally, storing the hash function indices and the transformed data representation of one representative data segment in a deduplication database.

Implementations of this aspect of the invention may include one or more of the following features. The method further includes storing the hash function indices with the original data set. Each data segment is transformed into a transform data representation via a Haar transform. The Haar transform may be a basic integer Haar transform or a packet transform. Each data segment is transformed into a transform data representation via a wavelet transform. The wavelet transform may be a Haar transform, a Daubechies 5/3 transform or algorithmic variations thereof. The original data set may be text, image, audio, financial data, or application binaries.

In general, in another aspect, the invention features a method for data deduplication including the following steps. First, segmenting an original data set into a plurality of data segments. Next, transforming the data in each data segment into a transformed data representation. Next, removing one or more data from the transformed data representations of each data segment, wherein the removed data comprise non-identical data, and thereby resulting with identical remaining transformed data representations for each data segment. Next, applying a hash function onto the remaining identical transformed data representations and thereby generating transformed data representations indexed by hash function indices. Next, for each of the transformed data segments with the identical transformed data representations, storing the hash function indices and the transformed data representation of one representative data segment in a deduplication database.

Implementations of this aspect of the invention may include one or more of the following features. The method may further include storing the one or more removed data from the transformed data representations for each data segment in a database with the original set of data. The method may further include storing the hash function indices in the database with the original set of data. The identical remaining transformed data representations for each data segment comprise structurally identical data representations for each data segment.

In general, in another aspect, the invention features a system for data deduplication including a deduplication engine. The deduplication engine includes means for segmenting an original data set into a plurality of data segments, means for transforming the data in each data segment into a transformed data representation, means for removing one or more data from the transformed data representations of each data segment, wherein the removed data comprise non-identical data, thereby resulting with identical remaining transformed data representations for each data segment, means for applying a hash function onto the remaining identical transformed data representations and thereby generating transformed data representations indexed by hash function indices, and means for storing the hash function indices and the transformed data representation of one representative data segment in a deduplication database, for each of the transformed data segments with the identical transformed data representations.

Implementations of this aspect of the invention may include one or more of the following features. The deduplication engine further includes means for storing the one or more removed data from the transformed data representations for each data segment in a database with the original set of data and means for storing the hash function indices in the database with the original set of data. The original data set may be text, image, audio, financial data, or application binaries.

In general, in another aspect, the invention features a system for data deduplication including a deduplication engine. The deduplication engine includes means for segmenting an original data set into a plurality of data segments, means for transforming the data in each data segment into a transformed data representation that comprises a band-type data structure, wherein the band-type structure comprises a plurality of bands, means for selecting a first set of bands, grouping them together and storing them with the original data set, wherein the first set of bands comprise non-identical transformed data for each data segment, means for selecting a second set of bands and grouping them together, wherein the second set of bands comprise identical transformed data for each data segment, means for applying a hash function onto the transformed data of the second set of bands and thereby generating transformed data segments indexed by hash function indices, and means for storing the hash function indices and the transformed data representation of one representative data segment in a deduplication database.

Implementations of this aspect of the invention may include one or more of the following features. The system means for storing the hash function indices include one or more virtual storage appliances provided by a cloud storage system. The system may further include a cache and a local storage device and the deduplication engine is located behind the cache and the local storage device. The system may further include one or more computing host systems and the computing systems connect to the deduplication engine via an Internet Small Computer System Interface (iSCSI). The system may further include a bi-directional network connection between the deduplication engine and a cloud storage appliance. The system may further include a cloud layout module and a cloud provider application programming interface (API).

Among the advantages of this invention may be one or more of the following. There are generally two advantages associated with using deduplication. First, the amount of capacity required to store the data will often decrease significantly when compared to un-deduplicated data, since typical user, application, and operating system behaviors lead to frequent redundant file storage within an enterprise. The use of email to distribute data files, for example, usually results in identical copies of those files stored across all the recipient's computers. Virtual servers, too, are often based off of common virtual images, and usually are only minor variations of each other. In a virtualized environment with a dozen virtual servers, the amount of unique data being stored might wind up being only 20% of the actual capacity being used.

The other advantage to deduplication arises when considering the cost of copying data to remote locations. Regardless of the mechanism used to transport the data, whether it is by tape, shipping disk, or transmission over a high-speed network, the time and overall cost is reduced by reducing the amount of data. Applying data deduplication before transport makes economic sense, even if the data is un-deduplicated at the remote location.

The details of one or more embodiments of the invention are set forth in the accompanying drawings and description below. Other features, objects and advantages of the invention will be apparent from the following description of the preferred embodiments, the drawings and from the claims.

BRIEF DESCRIPTION OF THE DRAWINGS

Referring to the figures, wherein like numerals represent like parts throughout the several views:

FIG. 2C is a block diagram depicting the formation of sub-bands in the Haar transformed data;

DETAILED DESCRIPTION OF THE INVENTION

Typical deduplication systems work in one of two ways: on-line or off-line. In an on-line system, duplicate segments are identified and replaced when initial write request is sent to the system, and before the completion acknowledgement of the request is transmitted back to the sender. Clearly, that requires extra work during a write cycle, and it also requires that work be done during read request handling to reconstruct the original data. Depending on the user and application performance requirements, the deduplication overhead may or may not be acceptable.

Off-line deduplication is done at some point after the original data has been written to the system. Often, for example, recently accessed data is stored in a local cache, and deduplication activities are performed as data is read from the cache and written to the long-term storage (or vice-versa). Alternatively, deduplication may be performed by a centralized backup server which reads from a set of primary storage volumes, deduplicating the data as it stores it to the backup data set. Off-line deduplication therefore requires more storage capacity than on-line versions. Since copies are only removed after some time period has elapsed, at least enough capacity must be available to store the full amount of data written during that time.

Figure 4:
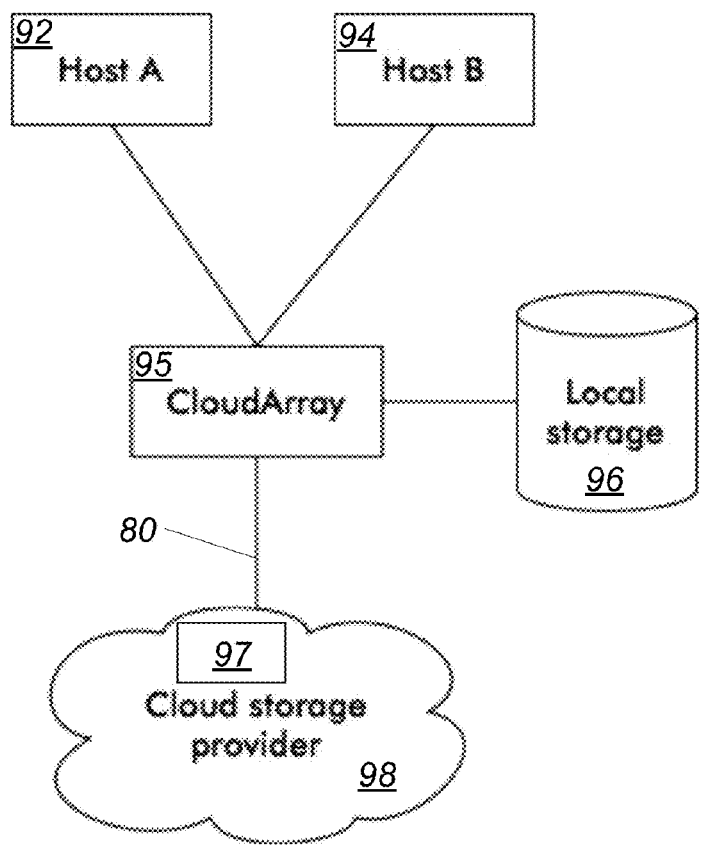
FIG. 4 is a schematic overview diagram of a cloud array data replication system.

The present invention utilizes a CloudArray based deduplication system. Referring to FIG. 4, a CloudArray based deduplication system 90 includes computing host system A 92, computing host system B 94, a CloudArray system 95, a local storage 96 and a cloud storage provider 98. Data in computing systems 92, 94 are stored in the local storage 96 and are replicated in cloud storage volumes 97 provided by the cloud storage provider 98. Host systems A, B, may be personal computers, servers, workstations, mainframe computers, desktop computers, laptop computers, computing circuits or any combination thereof. In one example, host A 92 is a personal computer and is connected to the local storage 96 via a cable connected to the computer's small computer system interface (SCSI) port. Local storage 96 is an external storage device, such as an optical disk or a magnetic tape. Host A 92 is also connected to a cloud storage device 97 provided by the cloud storage provider 98 via a network connection 80. Network connection 80 allows for bi-directional communication between the corresponding sites and may be wired or wireless connection, including Local Area Network (LAN), Wide Area Network (WAN), Personal Area Network (PAN), the Internet, and a Wireless Wide Area Network (WWAN), among others. CloudArray system 95 manages the data replication process within the CloudArray 90. In the CloudArray system 95, one or more virtual storage appliances 97 provided by cloud storage provider 98, present an iSCSI interface 93 to host operating systems A and B, 92, 94. Via that interface 93, the hosts 92, 94 are given access to virtualized block storage volumes in virtual appliances 97, using local block storage devices 96a, 96b as caches in front of remote cloud storage providers 98. In that way, CloudArray system 95 offers the user the ability to get the benefits of cloud storage, i.e. massive scalability and economies of scale, while mitigating the drawbacks of performance and security. The CloudArray system 95 includes a deduplication engine 82, a deduplication index and data cache 84, cloud layout modules 86a, 86b and a cloud provider API 86. The deduplication engine 82 is placed between the caching services 83 and the communications 80 with the cloud 98. Due to the nature of the interactions of the system 95 with the deduplication index 84, we are able to leverage the same cache that uses deduplication to cache the deduplication index. Thus, all of the data that is stored in the index will automatically be stored in the cloud.

The deduplication process in a CloudArray system 95 is an off-line, block-based deduplication. In operation, the system 95 is presented with some data set to store. It starts by segmenting the data into segments, i.e., deduplication blocks of some standard length. In one example, the segments are blocks having 4 k length. On each 4 k segment, system 95 applies a hash function, which is a type of function very commonly used in computer science. Hash functions are one-way functions, taking large "keys" as input and outputting a value that is, while not unique, very unlikely to "collide" with the output of other keys. That is, if two keys are input into a hash function, they are very unlikely to output the same value, unless the keys are actually the same. Significantly, though, there is no way to go the opposite direction—one cannot create a function that will, given the output of a hash function, tell you what key was used to generate that output. One common approach used in deduplication is to use cryptographic hash functions, which are designed to be highly resistant to collision. MD5, for example, has a 160 bit (20 byte) output, and is often used for deduplication. For each 4 k segment of the data set, the MD5 algorithm is run. Then, some form of central repository is consulted, which is typically a database associating hash outputs with data blocks. The database is queried to determine if the output of the hash function has been seen before by the system (i.e., if it is present in the database). If it has not, then the 4 k segment is inserted into the database along with the hash output as the key. Finally, the segment in the original data set is replaced by the 20 byte hash output, and the process is repeated for the next 4 k segment.

The end result is that the deduplication database winds up containing all of the original data indexed by the hash function output. Since all duplicate segments are mapped via the hash function to the same key, only one copy is stored in the database, and the storage for the original data simply consists of lists of those keys. If two of our 4 k segments match, for example, we wind up storing only 4096+20+20 or 4136 bytes, as opposed to 8096 bytes for an undeduplicated system. If ten of our 4 k segments match, then we'll store 4096+10*20 or 4296 bytes, as opposed to 40960 undeduplicated bytes.

The process is reversed in order to read data from a deduplication system. We look for the 20 byte key stored in the correct location on the original data set, and then query the database to find the original data, which is returned to the user. If the request is for a segment larger than our 4 k segments, then the process is repeated until the request is completely fulfilled.

There are a number of variations on this basic system using different hash functions, collision detection/handling algorithms, and basic segmentation approaches. Variable block lengths, for example, can allow us to represent longer runs of duplicate data in a constant space, or find smaller segments of more frequent duplication. But most block-based deduplication systems perform generally as described.

Deduplication on a CloudArray is essential for the reasons described above. If anything, the needs are even more pressing than for traditional storage systems, since the use of cloud storage as the long-term stable storage implies that efficient network utilization is absolutely important for the basic storage of data. Furthermore, the customer's usage of capacity on the cloud is essentially leased, therefore, reducing the amount of data stored reduces the monthly recurring costs. It is therefore vital that we achieve the best deduplication results we can, minimizing trips over the network and storage in the cloud.

One of the unique elements of the CloudArray deduplication system in the present invention comes from an additional step that is inserted into the typical approach described above. Before the data in a segment is hashed, it is transformed using an entirely different class of functions. These functions are designed in such a way as to restructure the data into a series of "bands", each of which is a representation of a particular way of sampling the original data. By removing certain of the resultant bands from the data that is passed through the hash function, we can make it more likely that the remaining bands will match others, even if the original data is quite different. Crucially, the functions we use are two-way, meaning that we can reconstruct the original data from the output. In fact, the length of the output is the same as the length of the input, but the arrangement of the data makes them more compressible using standard compression algorithms.

The class of transform functions we use come from wavelet theory. These transform functions include the Haar transform, the Daubechies 5/3 transform, or algorithmic variations on those. These functions take an input signal and transform it into a sequence of bands representing the signal at different resolutions or discrete samples. The specific wavelet transform used is not important to the system: what is important is that by removing one or more specific bands from the resultant data, we are left with a subset that can represent a large number of possible data blocks. Furthermore, we claim that the patterns that are left are more likely to recur across a broad set of real-world blocks.

Consider a simple example: two data sets consisting of a monotonically increasing sequence, e.g. {1, 2, 3, 4, 5, 6, 7, 8} and {207, 208, 209, 210, 211, 212, 213, 214}. Although we can visually and logically describe the similarities between these sets, standard compression algorithms will miss them. A (theoretical) wavelet transform, on the other hand, might encode them as {1, 1, 0, 0, 0, 0, 0, 0} and {207, 1, 0, 0, 0, 0, 0, 0}, respectively, capturing the structural similarities. Our deduplication algorithm would then remove the highest bands, {1} and {207}, leaving {1, 0, 0, 0, 0, 0, 0} to be hashed and stored. The removed bands are stored along with the output of the hash function in the representation of the original data.

The additional of a wavelet transformation step to standard storage deduplication is a radical departure from tradition. Instead of examining the original data for duplicates, we restructure it, remove those parts of the structure that are most likely to differ, and then proceed with deduplication. This structural similarity search is performed across all data within a system, whether it be images, audio, text, or application binaries.

Figure 1A:
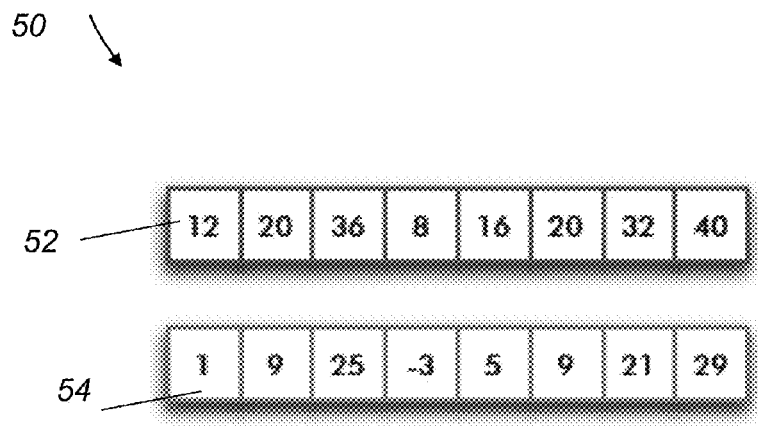
FIG. 1A is a block diagram of two exemplary data sets.
Figure 1B:
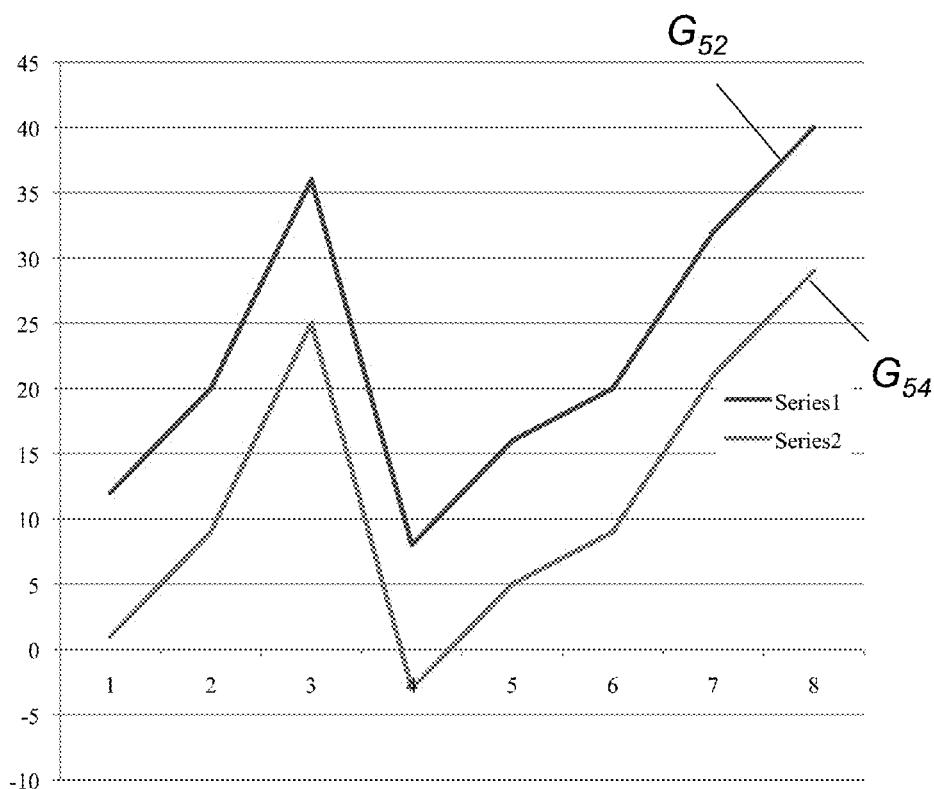
FIG. 1B is a graphical representation of the data sets of FIG. 1A.

The present approach to data deduplication starts with an observation that strict identity is not the only way to compare data. Instead, the present invention relies on locating structurally identical segments. Two segments are structurally identical when their transforms behave similarly. Referring to FIG. 1A, the two sets 52, 54 of data appear to be different. However, when they are represented graphically, they appear to behave similarly, i.e., $G_{52}=G_{54}$, as shown in FIG. 1B. Accordingly, instead of working with the data sets 52, 54 directly, we transform the data arithmetically via the Haar transform T into a form in which the structure becomes immediately apparent, as shown in FIG. 1D.

Figure 1C:
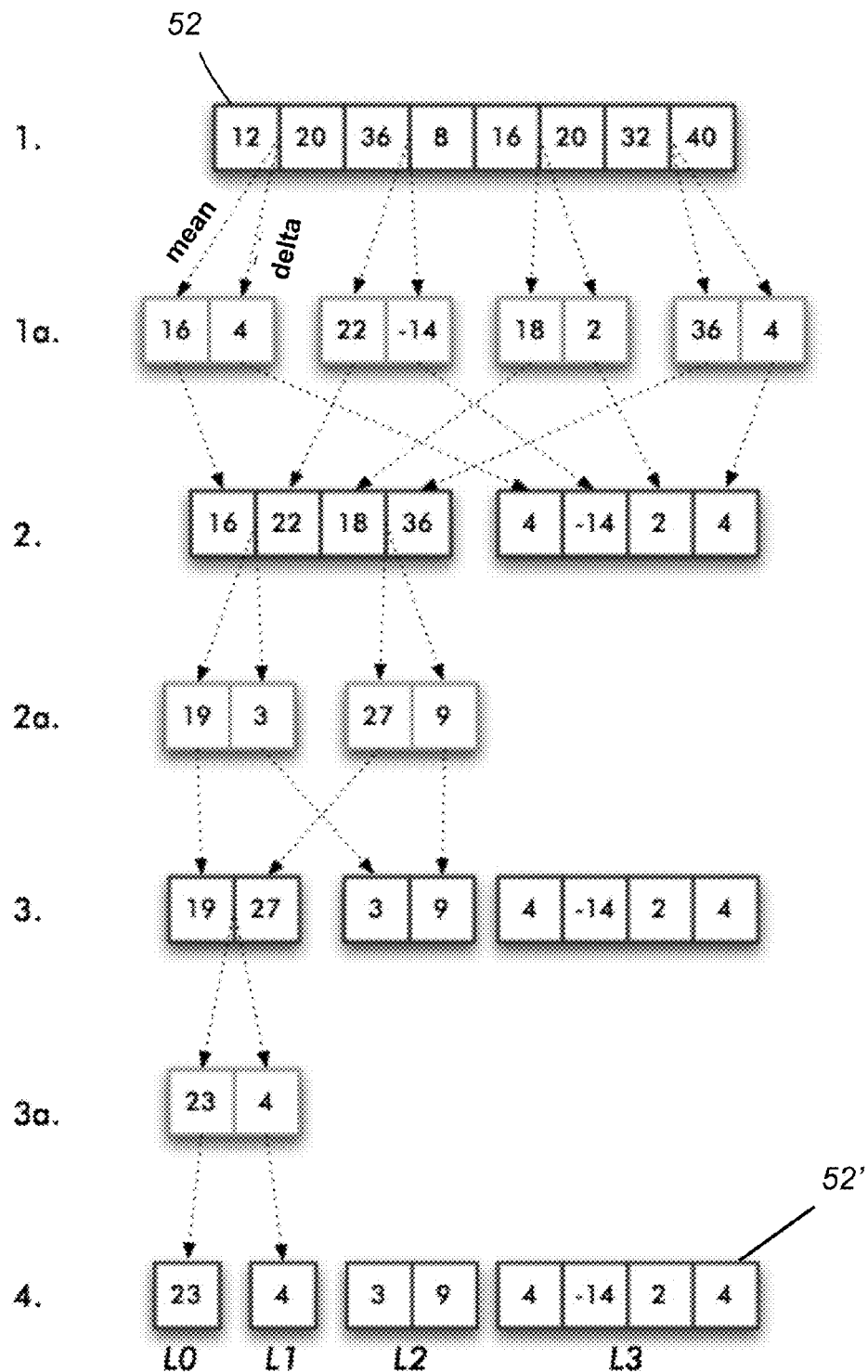
FIG. 1C is a block diagram of the Haar transform applied to one of the data sets of FIG. 1A.
Figure 1D:
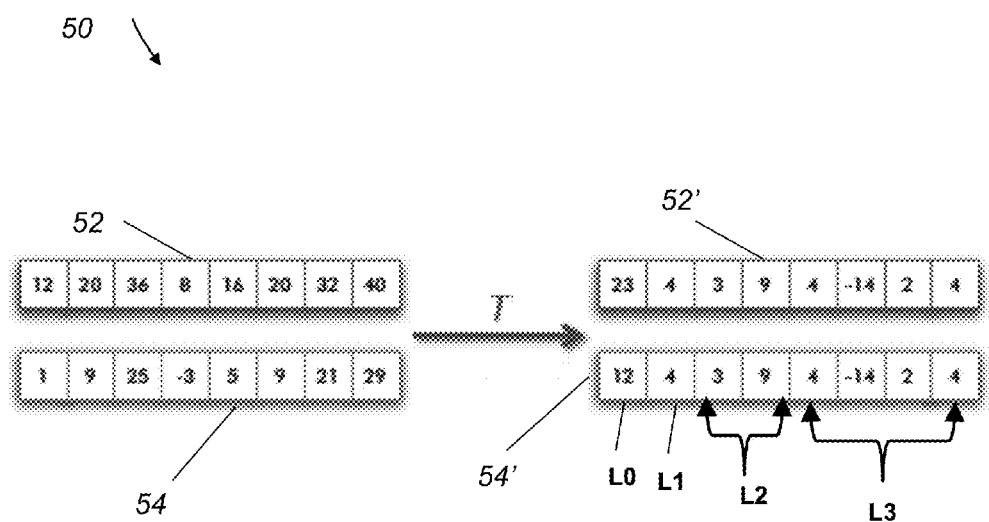
FIG. 1D is a block diagram of the Haar transformed data sets of FIG. 1A.

Referring to FIG. 1C, in this example, we are performing a Haar transform on a vector of size eight (1). The first step is to consider each sequential pair of elements in the vector, calculating both the mean value of those elements, and the difference between the original element and the mean (1*a*). The absolute value of the difference is the same for each element in the pair, by the definition of the mean value. The delta values are then grouped together and placed at the tail of a new vector, while the means are grouped at the head (2). The computation is then repeated using only the mean values as the new vector (2*a*). The above mentioned steps are performed recursively, halving the vector at each step, until we are left with a single value, which is the arithmetic mean of the original data (steps 3, 3*a*, 4). We consider each of the groups of delta values to be a distinct level or band, representing the variation in the original vector at increasing levels of resolution. So, for example, if we choose to look at the average of the original vector, we can look at the L0 band and determine that it is 23, but if we wanted to descend a level and incorporate the L1 band, we could calculate (23−4, 23+4) to arrive at (19, 27), which is the average of the first half of the original vector and the average of the second half of the original vector. Incorporating further bands yields averages at finer and finer grains, until we arrive at the original data vector. Removing one band, e.g. L0, results in a way to represent a large set of significant variations if we allow L0 to be replaced by an unknown. In a real Cloud-Array implementation, the data vectors are much larger, ranging from 128 to 4096 bytes, but due to the nature of the transform, they must always be powers of 2.

In general, to define structurally identical segments, we can regard the contents of a storage container, e.g. a storage volume, as a function f which maps an integer offset to an integer value. We can then consider an additional set of functions G, each of which maps an m-length vector of integers to an n-length vector of integers. The set G has the property that for every function $g_i$, its output vector corresponds to a vector composed of [f(i+cn), f(i+cn+1), . . . , f(i+cn+n−1)]. In other words, each function in the set G corresponds to a location on the storage volume.

One approach to defining G is to simply use the identity function: each $g_i$ returns the same vector that is passed in. In this case, m=n, and there is essentially only one function, g, repeated over the entire length of the disk. The input is the same size as the output, and we must compare the vectors directly in order to find duplicates. But if m<n, then the story changes significantly. Now the functions in G must map the inputs in some non-trivial way in order to change the dimensionality of the output. Furthermore, we can now represent the storage volume in a new and interesting way: it is now a combination of a set of input vectors I and a set of functions G, each corresponding to a location on the original volume. And we can finally reach our definition: two segments i and k are structurally identical over G if $g_i=g_k$, even if the $i_i$ and $i_k$ input vectors differ.

As an example: consider a storage volume that is entirely filled with monotonically incremented integers, e.g. [1, 2, 3, 4, 5, 6, 7, 8]. We can craft a function s which takes a done-dimensional vector x as input and outputs an n-dimensional vector:

$$s(x)=[x,x+1, \ldots ,x+n-1]$$

Now, for each $g_i$ in our function set G, we can store the function s, and our input vector set I consists of the x values at every n-th offset. We have not yet necessarily achieved any compression, depending on how we represent s, since we still have to store that representation for every element of I. But by our definition, every segment on our storage volume is structurally identical, and since our input length m is less than our output length n, it's a non-trivial identification.

It's worth noting that this definition of structural integrity is trivial and uninteresting if G contains only the identity function, since it will result in all segments being structurally identical. Once we have a non-trivial set G, then we can seek out those structurally identical segments by finding a way to match individual g functions. Continuing with the functional approach, we need to find a function h which takes as input an individual function and outputs a unique identifier, such that $h(g_i)=h(g_k)$ if and only if $g_i=g_k$. h is essentially a hashing function, and can serve as the basis of an index into which we can store each element of G.

Finally, we have all the elements that we need in order to describe structural deduplication. Given an input vector set I, a function set G (both ordered sets, by the way), and a hashing function h, we can construct an index containing the set of all unique functions in G, and a new set G' which consists of an ordered set constructed by:

$$g'_i=h(g_i)$$

Assuming that the output of h is significantly smaller than the representation of $g_i$, then we can potentially achieve substantial data reduction. Note that two segments which are identical in the original f are always structurally identical, so as long as we carefully engineer the input vector length m and the size of the hash identifier, we will always achieve results at least as good as the baseline data deduplication. Note also that we can potentially see benefits by applying the approach recursively: after obtaining I, we can seek out structural identities within that set. The big question left unaddressed in this section is: how do we find I and G?

For any storage volume, there are literally an infinite number of different ways to decompose it into our I and G sets. In order for a decomposition to be useful, it must accomplish a number of goals:

it must minimize the length m of each input vector,
it must be able to represent each function in a length that is no greater than n-m,
it must minimize the number of unique elements in G (alternatively, it must maximize structural identity), and
it must be lossless, so that all data from f is retrievable, bit for bit.

One approach to defining G is to define a single transform operator t such that for each representation $r_i$ and input vector $x_i$:

$$g_i(x)=t(x_i,r_i)$$

t is essentially a one-size-fits-all transformation function that combines input vectors and representation vectors to return the original data from f.

Selecting a single t introduces some limitations: in particular, different data set types may maximize structural identity with different operators. Image data, for example, will probably find more structural matches using an operator that treats the representation as a two-dimensional array, while financial data will work better with an operator that works on time sequences. Our initial approach is to find a decent general-purpose compromise, while leaving open the possibility for fine-tuning the operator selection when more is known about the data.

One set of transforms that is especially promising comes from the field of wavelets. In a discrete wavelet transform, a given discrete waveform is repeatedly scaled and translated into a set of sub-bands. Each sub-band contains a frequency representation of the original data at a different scale, and the transformation can be reversed by inverting the translation and scaling. Given the fundamental constraint that we are working on storage volumes, best suited for integer representations, and the above-described constraint that we should use a general-purpose transformation at the start, the best candidate wavelet is a variant on the Haar transform.

Examples of wavelet transforms include the basic Integer Haar transform and the packet transform, each of which has strengths. The basic transform operation is the same: incoming data is transformed using the selected operator, some subset of the sub-bands is selected to serve as the $x_i$ vector, and the remainder is stored as the $r_i$ vector. Which sub-bands go where is crucial: we want $x_i$ to be small, and $r_i$ to be general.

Figure 5:
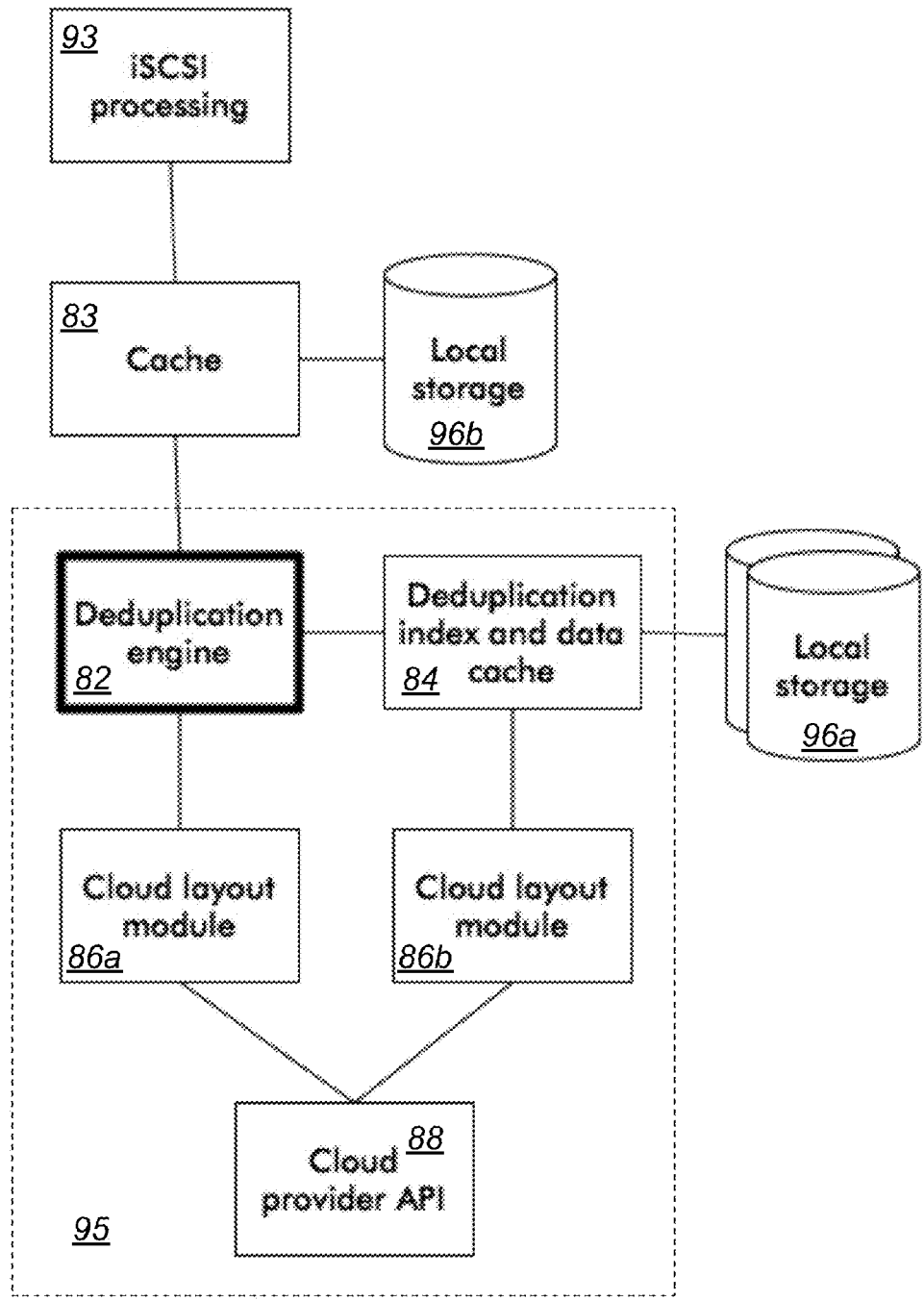
FIG. 5 is a block diagram of the cloud array data replication system with the deduplication system of this invention.

In the CloudArray system 90, one or more deduplication modules 95 are placed behind the storage volume caches 96, and 96a, 96b, 83, shown in FIG. 4, and FIG. 5, respectively. Architecturally, multiple caches and multiple volumes may share a single deduplication module, and multiple deduplication modules may be deployed.

Figure 2:
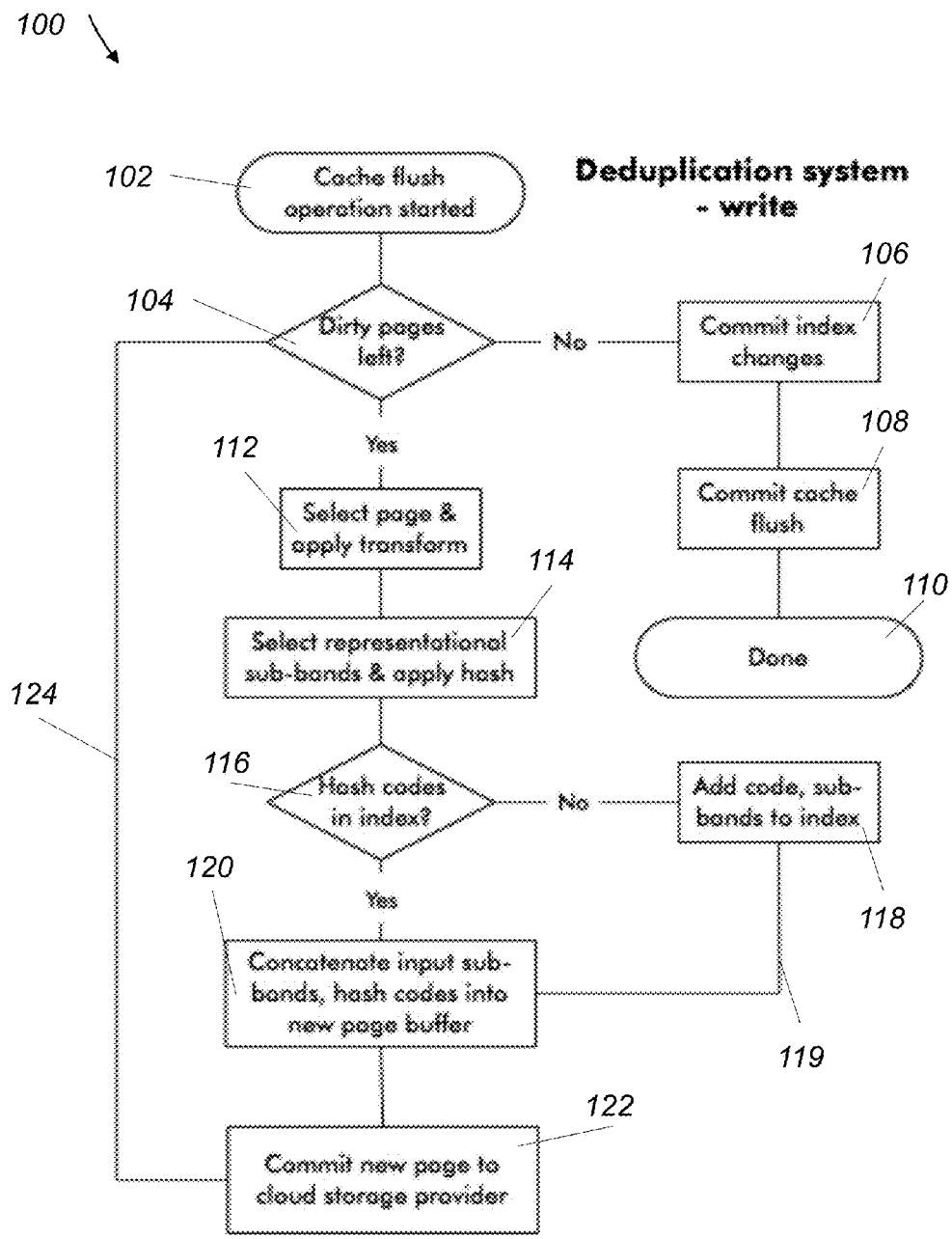
FIG. 2 is a flow diagram of the write process in a data deduplication system of this invention.
Figure 2A:
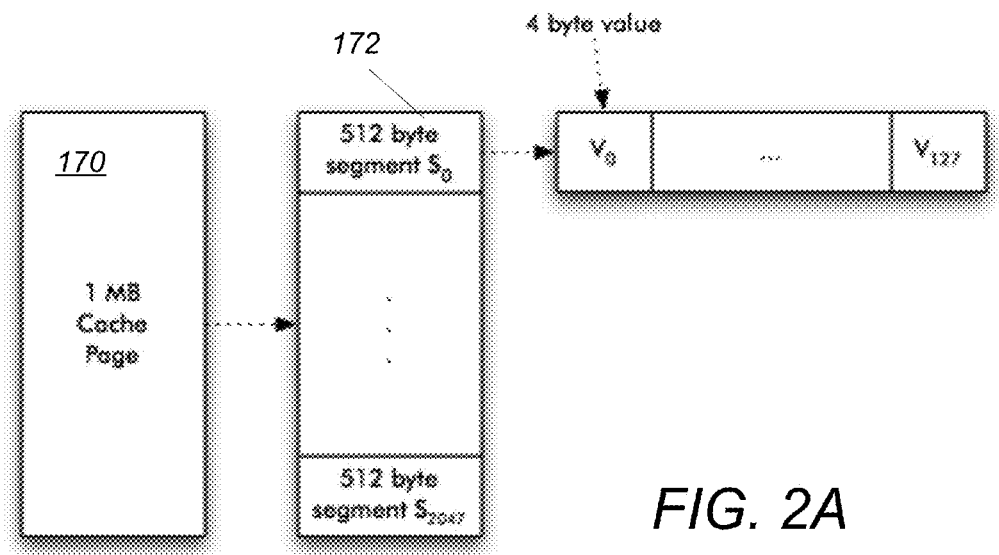
FIG. 2A is a block diagram of the segmentation step in the deduplication process of this invention.
Figure 2B:
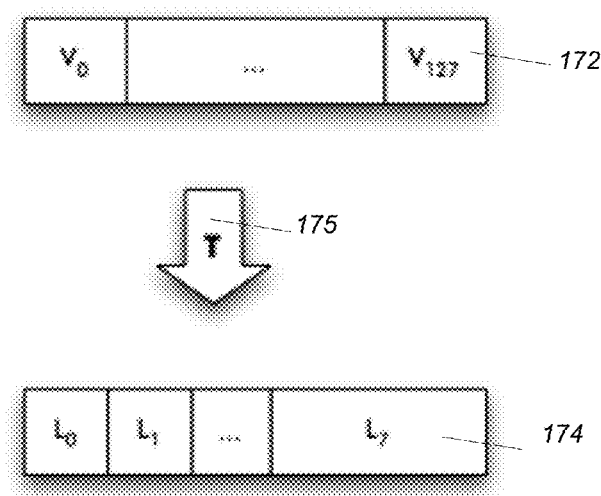
FIG. 2B is a block diagram of the Haar transformation step in the deduplication process of this invention.
Figure 2C:
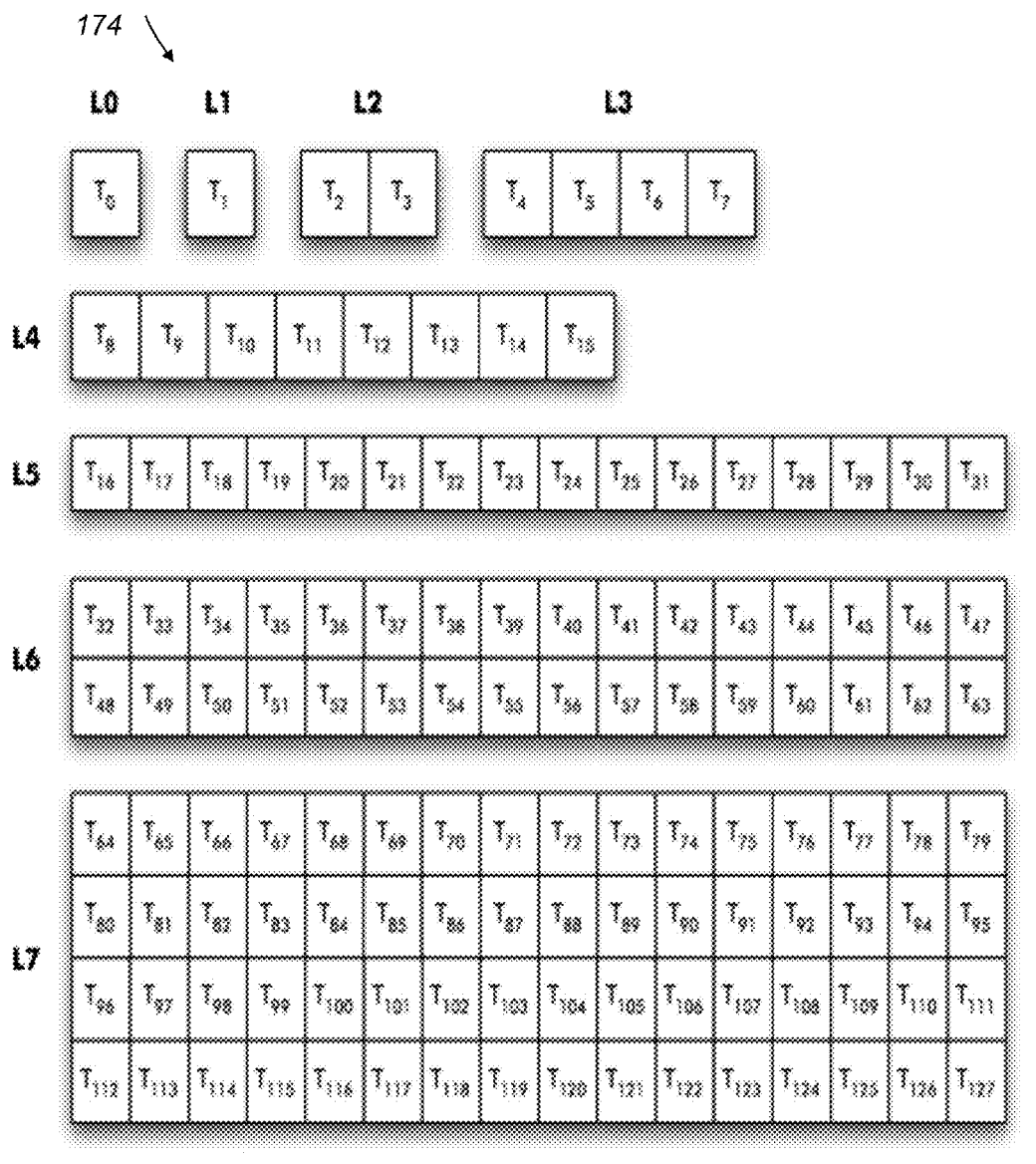
Figure 2D:
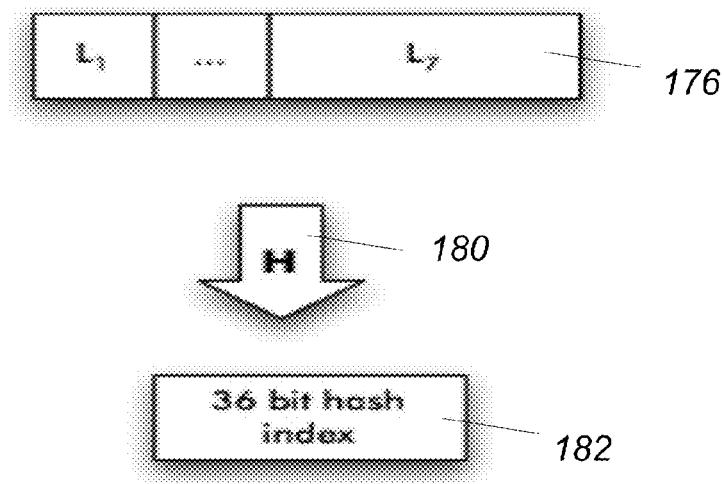
FIG. 2D is a block diagram of the step of selecting one set of sub-bands and applying a hash function onto the selected set of the sub-bands.

Referring to FIG. 2, caches store data in cache pages, and dirty cache pages are periodically flushed to the cloud (102), (104). When a page is flushed from the cache, it is intercepted by the deduplication module and the data is transformed according to the selected operator, i.e. integer Haar, the packet transform, among others (112). From the transformed data, the deduplication module extracts one set of sub-bands i.e., the input sub-bands (x) and a second set of sub-bands, i.e., the representation sub-bands (r) (114). The representation sub-bands r is then hashed and resulting hash identifier $h_r$ is compared with the contents of the deduplication index (116). If $h_r$ exists in the index already, then x, $h_r$, and some additional indexing metadata are concatenated and transmitted to the cloud in place of the original data (120). If $h_r$ is not in the index, then r is placed into the index with $h_r$ as the key (11), and the above concatentation/transmission also occurs (119). At the end of the cache flush operation, but before the flush is atomically committed to the cloud, any changes to the index are atomically transmitted to the cloud (122). After the index in the cloud has been updated, then the cache flush is finally allowed to commit (108).

Figure 2E:
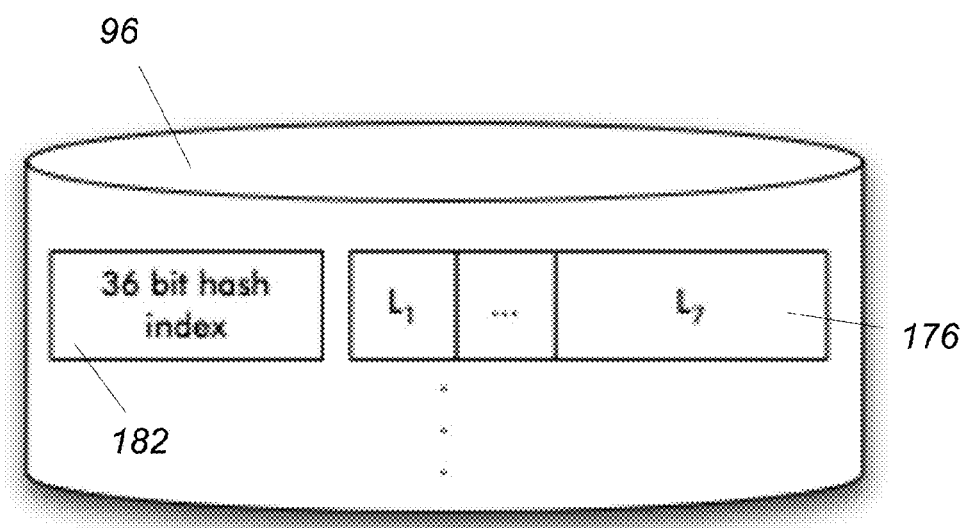
FIG. 2E depicts the storage of the hash indices and the data in the selected set of sub-bands.
Figure 2F:
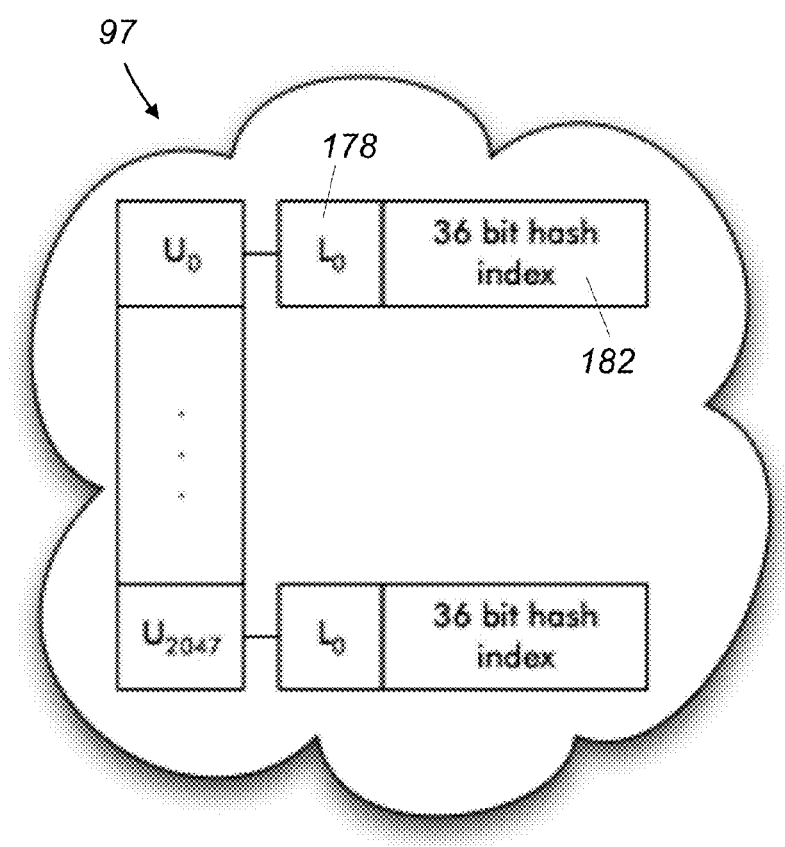
FIG. 2F depicts the storage of the original data, the hash indices of the selected set of sub-bands and the data in the remaining set of sub-bands.

The individual steps of the process steps of FIG. 2 are described with reference to FIG. 2A-FIG. 2F. In this example, we will demonstrate the write phase of a simple deduplication configuration on CloudArray. The example is configured to use an integer Haar transform, with only L0-band removal, operating on 512-byte segments. Writes to the deduplication engine are received in units of cache pages 170, which are typically set as one megabyte regions of the original block device. The engine will first segment the cache page into 512-byte vectors 172. Integers are represented as four-bytes in memory and on disk, so the resulting vector 172 is 128 elements long ($V_0 \ldots V_{127}$), shown in FIG. 2A. The Haar transform T is then applied to vector 172, resulting in a band structure 174 with eight sub-bands ($L_0$, $L_1$, ... $L_7$), shown in FIG. 2B. The sub-bands ($L_0$, $L_1$, ... $L_7$) are actually levels that occur during the recursive application of the transform stages. If one examines the levels individually, one sees the power-of-two nature of this transform, i.e., $L_0$ ($2^0$), $L_1$ ($2^1$), $L_2$ ($2^1$), $L_3$ ($2^2$), $L_4$ ($2^3$), $L_5$ ($2^4$), $L_6$ ($2^5$), and $L_7$ ($2^6$), shown in FIG. 2C. In our example configuration, we next select and apply the hash function H 180 to the L1-L7 sub-bands 176, thereby generating a 36-bit hash index 182, shown in FIG. 2D. Next, we proceed to store data in two places. First, we push the sub-bands $L_1$-$L_7$ 176 into the database, indexed by the hash value 182, as shown in FIG. 2E. Next, we replace the original user data in the original write request with sub-band $L_0$ and the hash value 182, and then proceed to follow the same steps for each segment in the cache page, ultimately writing entire transformed page to the cloud, as shown in FIG. 2F. The original cache page data are retrieved, by iterating through the segments, combining each sub-band $L_0$ with the sub-bands $L_1$-$L_7$ data retrieved by looking up the hash index 182 in the database, and then inverting the Haar transform. The observed advantage comes from the fact that removing the value stored in sub-band $L_0$ from the data vector admits a higher likelihood of finding matching data. One might argue that removing any element from any data set increases the probability of matching remaining elements. Our observation is that in the absence of any information about the structure of the original data, selecting an element for removal is entirely arbitrary. The wavelet transform is precisely designed to encode structural information about data, whether it be as a signal, an image, or numeric, and thus we can select meaningful elements (bands) for removal.

Index management is critical both to performance and correctness. Certain parts of the index must remain fully replicated locally in order for index operations to be done in a reasonable amount of time. In order for atomicity to be correct, items can only be removed from the index after the cache flush is fully committed.

Figure 3:
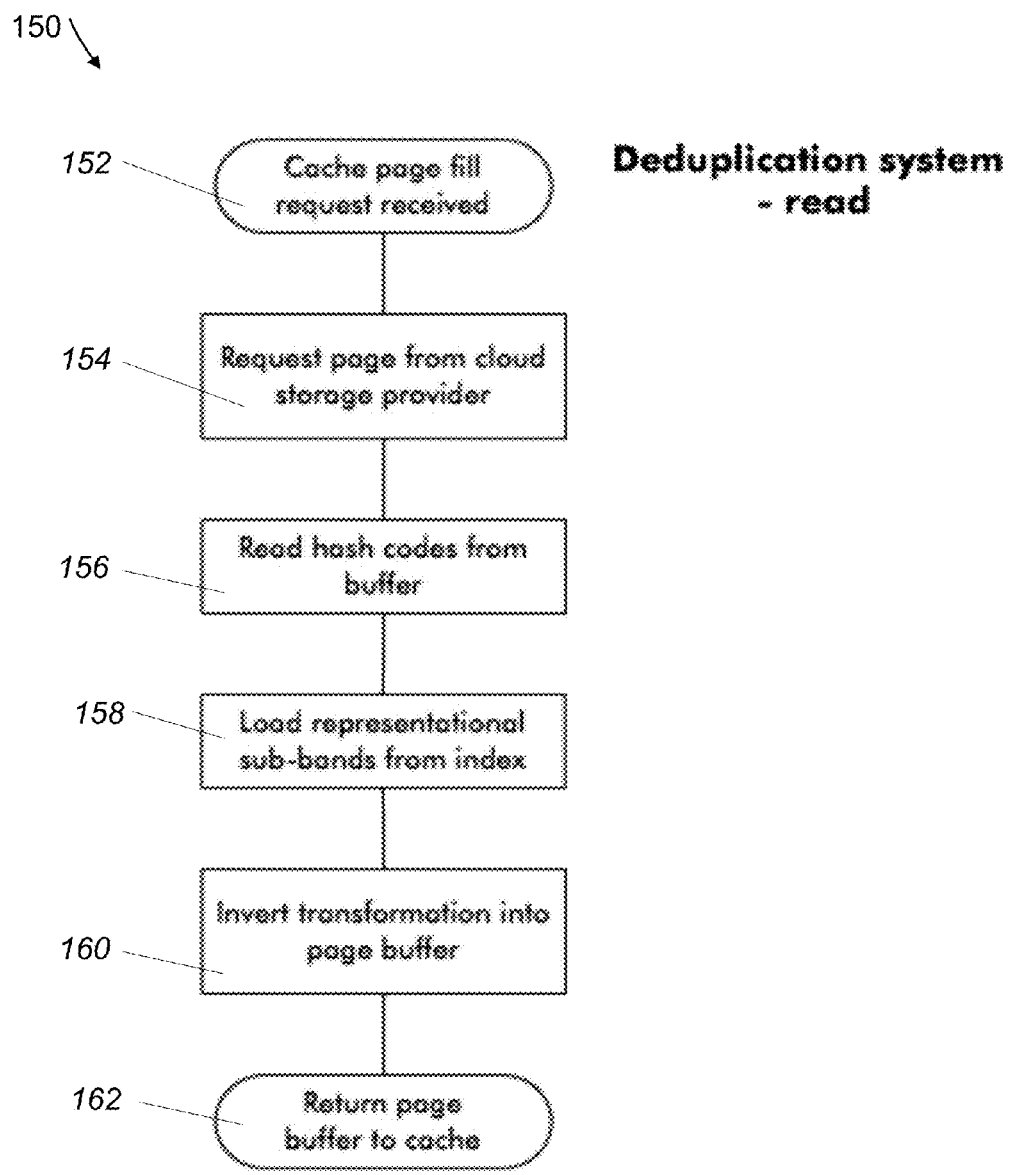
FIG. 3 is a flow diagram of the read process in a data deduplication system of this invention.

Referring to FIG. 3, data that have been deduplicated are retrieved based on the following process steps 150. First, the page is read from the cloud (152), (154), thereby retrieving the x and $h_r$ components. Then, the corresponding r components are retrieved from the index, possibly entailing another cloud read (156). Finally, the x and r components are combined (158) and the inverse operation is performed (160), yielding the original cache page (162).

In a real world scenario, a customer may allocate, for example, ten storage volumes of 100 GB each, attaching them to a VMWare ESX server and creating one virtual machine per volume. They load an operating system onto each virtual machine: say, Red Hat Linux. Each virtual machine is used to perform some different function within their data center.

If those 100 GB volumes are created on a CloudArray as part of a deduplication set, they immediately have two capacity management advantages: one, they are thin provisioned, and two, they are deduplicated. Thin provisioning is a property of all CloudArray volumes, and it means that no storage blocks are allocated until they are written to. If one of the systems has written only 100 kilobytes to its storage volume, then only 100 kilobytes is stored in the cloud, even though 100 GB is reserved for that volume. Since one pays for cloud storage only when one uses cloud storage, thin provisioning results in substantial cost savings.

The deduplication benefits really kick in when multiple volumes are used for the same purpose. In each of those storage volumes, the same base operating system is being deployed, which results in the same base files being stored. If a base Red Hat installation requires 20 GB of storage, then preparing those 10 volumes for use involves immediately allocating and paying for 200 GB of storage on the cloud. But if these are all the same base Red Hat installation, or even if they differ slightly in minor details, then the deduplication engine will discover all of the identities and result in only 20 GB of storage being used.

Each storage volume will still appear to have 100 GB of capacity and 20 GB used in operating system files, but the actual cloud storage used will reflect the effects of thin provisioning and deduplication: instead of 10*100 GB=1 TB of storage, the cloud will contain 20 GB. Given the structural deduplication capabilities of CloudArray, we would expect the growth of actual storage used in this scenario to be significantly slower than in a non-CloudArray environment. As the storage volumes naturally diverge from their initial nearly identical state, structural identity will result in more matches being discovered and less data being written to the cloud storage provider.

Several embodiments of the present invention have been described. Nevertheless, it will be understood that various modifications may be made without departing from the spirit and scope of the invention. Accordingly, other embodiments are within the scope of the following claims.

What is claimed is:

1. A method for data deduplication comprising:
    segmenting an original data set into a plurality of data segments;
    applying a transform function to the data in each data segment of the plurality of data segments and transforming the data in said each data segment into a transformed data representation that comprises a band-type structure for said each data segment, wherein said band-type structure comprises a plurality of bands;

partitioning the plurality of bands into a first set of one or more bands of the plurality of bands and a second set of one or more bands of the plurality of bands, wherein the plurality of bands for each data segment of the plurality of data segments encodes structural information about said each data segment, wherein said first set of one or more bands is different in the transformed data representations of the plurality of data segments, wherein said second set of one or more bands, in the transformed data representations of the plurality of data segments, is identical transformed data indicating that the plurality of data segments comprise structurally identical data having transformed data representations that behave similarly and wherein the plurality of data segments are not identical;

applying a hash function onto the identical transformed data of the second set of one or more bands for the plurality of data segments and thereby generating transformed data segments indexed by hash function indices, wherein said hash function is not applied to the transformed data of the first set of one or more bands that is different in the transformed data representations of the plurality of data segments; and storing a single copy of the identical transformed data with an associated hash value generated by the hash function for the identical transformed data in a deduplication database.

2. The method of claim 1 further comprising storing the hash function indices and the first set of bands with the original data set.

3. The method of claim 1, wherein each of the plurality of data segments is transformed into a transform data representation via a Haar transform function.

4. The method of claim 3, wherein said Haar transform function comprises one of a basic integer Haar transform function or a packet transform function.

5. The method of claim 1, wherein each of the plurality of data segments is transformed into a transform data representation via a wavelet transform function.

6. The method of claim 5, wherein said wavelet transform function comprises one of Haar transform function, a Daubechies 5/3 transform function or algorithmic variations thereof.

7. The method of claim 1 wherein said original data set comprises one of text, image, audio, financial data, or application binaries.

8. A method for data deduplication comprising:
segmenting an original data set into a plurality of data segments;
applying a transform function to the data in each data segment of the plurality of data segments and transforming the data in said each data segment into a transformed data representation comprising a band-type structure including a plurality of bands, wherein the plurality of bands for each data segment of the plurality of data segments encodes structural information about said each data segment;
removing one or more of the plurality of bands from each of the transformed data representations of the plurality of data segments thereby resulting in remaining transformed data representations for the plurality of data segments, wherein said one or more of the plurality of bands removed are different in the transformed data representations and wherein the remaining transformed data representations for the plurality of data segments are identical remaining transformed data representations indicating that the plurality of data segments comprise structurally identical data having transformed data representations that behave similarly and wherein the plurality of data segments are not identical;
applying a hash function onto the identical remaining transformed data representations and thereby generating transformed data representations indexed by hash function indices; and
storing a single copy of the identical remaining transformed data representation with an associated hash value generated by the hash function for the identical remaining transformed data representation in a deduplication database.

9. The method of claim 8, further comprising storing the one or more of the plurality of bands removed from the transformed data representations for the plurality of data segments in a database with the original data set.

10. The method of claim 9 further comprising storing the hash function indices in the database with the original set of data.

11. A system for data deduplication comprising:
one or more computing host systems;
a deduplication engine configured to segment an original data set into a plurality of data segments, configured to apply a transform function to the data in each data segment of the plurality of segments and to transform the data in said each data segment into a transformed data representation comprising a band-type structure including a plurality of bands encoding structural information about said each data segment, configured to remove one or more of the plurality of bands from each of the transformed data representations of said plurality of data segments thereby resulting in remaining transformed data representations for the plurality of data segments, wherein said one or more of the plurality of bands removed are different in the transformed data representations and wherein the remaining transformed data representations for the plurality of data segments are identical remaining transformed data representations indicating that the plurality of data segments comprise structurally identical data having transformed data representation that behave similarly and wherein the plurality of data segments are not identical, configured to apply a hash function onto the identical remaining transformed data representations and thereby to generate transformed data representations indexed by hash function indices; and
a storage device that stores a single copy of the identical remaining transformed data representation with an associated hash value generated by the hash function for the identical remaining transformed data representation.

12. The system of claim 11, wherein said deduplication engine is further configured to store the one or more removed bands from the transformed data representations for plurality of data segments in a database with the original set of data and is further configured to store the hash function indices in the database with the original set of data.

13. The system of claim 11, wherein said original data set comprises one of text, image, audio, financial data, or application binaries.

14. A system for data deduplication comprising:
one or more computing host systems;
a deduplication engine configured to segment an original data set into a plurality of data segments, configured to apply a transform function to the data in each data segment in the plurality of data segments and to transform the data in said each data segment into a transformed data representation that comprises a band-type structure, wherein said band-type structure for said each data segment comprises a plurality of bands encoding structural information about said each data segment, configured to partition the plurality of bands into a first set of one or more bands of the plurality of bands and a second set of one or more bands of the plurality of bands, wherein said first set of one or more bands is different in the plurality of data segments, wherein said second set of one or more bands, for the plurality of data segments, is identical transformed data indicating that the plurality of data segments comprise structurally identical data having transformed data representations that behave similarly and wherein the plurality of data segments are not identical, configured to apply a hash function onto the identical transformed data of the second set of one or more bands and thereby to generate transformed data segments indexed by hash function indices, wherein said hash function is not applied to the transformed data of the first set of one or more bands that is different in the transformed data representations of the plurality of data segments; and
a database that stores a single copy of the identical transformed data with an associated hash value generated by the hash function for the identical transformed data.

15. The system of claim 14, further comprising a storage device that stores the hash function indices and wherein the storage device comprises one or more virtual storage appliances provided by a cloud storage system.

16. The system of claim 14, further comprising a cache and a local storage device and wherein said deduplication engine is located behind said cache and said local storage device.

17. The system of claim 14, wherein said one or more computing host systems connect to said deduplication engine via an Internet Small Computer System Interface (iSCSI).

18. The system of claim 14 further comprising a bi-directional network connection between said deduplication engine and a cloud storage appliance.

19. The system of claim 14 further comprising a cloud layout module and a cloud provider application programming interface (API).

20. The method of claim 1, further comprising:
storing a representation of the original data set that is a deduplicated representation of the original data set, said representation of the original data set including, for each of the plurality of data segments, the first set of one or more bands for said each data segment and a hash value generated by the hash function for the second set of one or more bands for said each data segment, wherein a database is indexed by hash values said hash value being included in an index.

21. A non-transitory computer readable medium comprising code stored thereon that, when executed, performs a method for data deduplication comprising:
segmenting an original data set into a plurality of data segments;
applying a transform function to the data in each data segment of the plurality of data segments and transforming the data in said each data segment into a transformed data representation that comprises a band-type structure for said each data segment, wherein said band-type structure comprises a plurality of bands;
partitioning the plurality of bands into a first set of one or more bands of the plurality of bands and a second set of one or more bands of the plurality of bands, wherein the plurality of bands for each data segment of the plurality of data segments encodes structural information about said each data segment, wherein said first set of one or more bands is different in the transformed data representations of the plurality of data segments, wherein said second set of one or more bands, in the transformed data representations of the plurality of data segments, is identical transformed data indicating that the plurality of data segments comprise structurally identical data having transformed data representations that behave similarly and wherein the plurality of data segments are not identical;
applying a hash function onto the identical transformed data of the second set of one or more bands for the plurality of data segments and thereby generating transformed data segments indexed by hash function indices, wherein said hash function is not applied to the transformed data of the first set of one or more bands that is different in the transformed data representations of the plurality of data segments; and
storing a single copy of the identical transformed data with an associated hash value generated by the hash function for the identical transformed data in a deduplication database.

22. A non-transitory computer readable medium comprising code stored thereon that, when executed, performs a method for data deduplication comprising:
segmenting an original data set into a plurality of data segments;
applying a transform function to the data in each data segment of the plurality of data segments and transforming the data in said each data segment into a transformed data representation comprising a band-type structure including a plurality of bands, wherein the plurality of bands for each data segment of the plurality of data segments encodes structural information about said each data segment;
removing one or more of the plurality of bands from each of the transformed data representations of the plurality of data segments thereby resulting in remaining transformed data representations for the plurality of data segments, wherein said one or more of the plurality of bands removed are different in the transformed data representations and wherein the remaining transformed data representations for the plurality of data segments are identical remaining transformed data representations indicating that the plurality of data segments comprise structurally identical data having transformed data representations that behave similarly and wherein the plurality of data segments are not identical;
applying a hash function onto the identical remaining transformed data representations and thereby generating transformed data representations indexed by hash function indices; and
storing a single copy of the identical remaining transformed data representation with an associated hash value generated by the hash function for the identical remaining transformed data representation in a deduplication database.

* * * * *